United States Patent
Stokes et al.

(10) Patent No.: US 10,069,126 B2
(45) Date of Patent: *Sep. 4, 2018

(54) SURFACE MODIFIED POLYMERIC MATERIALS, MODIFIED FUNCTIONALIZED POLYMERS, FUNCTIONAL POLYMERS, AND METHODS

(75) Inventors: Kristoffer K. Stokes, Charlotte, NC (US); Karl F. Humiston, Fort Mill, SC (US)

(73) Assignee: Celgard, LLC, Charlotte, NC (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/551,883

(22) Filed: Jul. 18, 2012

(65) Prior Publication Data
US 2013/0022876 A1    Jan. 24, 2013

(51) Int. Cl.
*H01M 2/16*    (2006.01)
*C08J 5/22*    (2006.01)
(Continued)

(52) U.S. Cl.
CPC ............. *H01M 2/162* (2013.01); *B32B 27/12* (2013.01); *B32B 27/16* (2013.01); *B32B 27/32* (2013.01);
(Continued)

(58) Field of Classification Search
CPC ... H01M 2/14–2/1626; C08J 7/18; C08J 5/04; C08J 5/18; C08J 7/12;
(Continued)

(56) References Cited

U.S. PATENT DOCUMENTS 4,365,049 A * 12/1982 Tsunoda et al. ............... 526/245
4,401,567 A *  8/1983 Shindo ............... B01D 67/0027
                                                210/500.22
(Continued)

FOREIGN PATENT DOCUMENTS

WO    WO 94/25503 A1    11/1994
WO    WO 00/26180 A1     5/2000
(Continued)

OTHER PUBLICATIONS

Yan, M., Photochemical Functionalization of Polymer Surfaces and the Production of Biomolecule-Carrying Micrometer-Scale Structures by Deep-UV Lithography Using 4-Substituted Perfluorophenyl Azides, J. Am. Chem. Soc., 1993, 115 (2), pp. 814-816.*

(Continued)

*Primary Examiner* — Frank J Vineis
(74) *Attorney, Agent, or Firm* — Hammer & Associates, P.C.

(57) ABSTRACT

The present invention relates to new, improved or modified polymer materials, membranes, substrates, and the like and to new, improved or modified methods for permanently modifying the physical and/or chemical nature of surfaces of the polymer materials, membranes, or substrates for a variety of end uses or applications. For example, one improved method uses a carbene and/or nitrene modifier to chemically modify a functionalized polymer to form a chemical species which can chemically react with the surface of a polymer substrate and alter its chemical reactivity. Furthermore, this invention can be used to produce chemically modified membranes, fibers, hollow fibers, textiles, and the like.

10 Claims, 3 Drawing Sheets

Polymer based substrate

······· Functional polymer (Component A)

⅄ Crosslinker (Component B)

▽▽▽ Polymer substrate (Component C)

(51) Int. Cl.
 C08J 7/12 (2006.01)
 B32B 27/16 (2006.01)
 B32B 27/32 (2006.01)
 C08J 5/18 (2006.01)
 B32B 27/12 (2006.01)
 C08J 5/04 (2006.01)
(52) U.S. Cl.
 CPC . *C08J 5/04* (2013.01); *C08J 5/18* (2013.01); *C08J 5/22* (2013.01); *C08J 7/12* (2013.01); B32B 2305/026 (2013.01); B32B 2457/10 (2013.01); C08J 2323/02 (2013.01); Y10T 428/249921 (2015.04); Y10T 428/249978 (2015.04); Y10T 428/2975 (2015.01); Y10T 442/2148 (2015.04)
(58) Field of Classification Search
 CPC ............... C08J 2323/02; B32B 27/322; B32B 2457/10; B32B 2305/026; Y10T 428/249978; Y10T 428/249921; Y10T 428/2975; Y10T 442/2148
 USPC ......... 442/79–84, 86–92, 118–119, 149–151
 See application file for complete search history.

(56) References Cited

U.S. PATENT DOCUMENTS

| | | | |
|---|---|---|---|
| 4,602,987 | A | 7/1986 | Bonaventura et al. |
| 5,154,808 | A | 10/1992 | Miyasaka et al. |
| 6,080,507 | A * | 6/2000 | Yu .................. B29C 55/065 156/163 |
| 6,183,901 | B1 | 2/2001 | Ying et al. |
| 6,287,730 | B1 * | 9/2001 | Callahan et al. ............. 429/249 |
| 2003/0026932 | A1 * | 2/2003 | Johnson ................. B32B 15/08 428/40.1 |
| 2004/0234862 | A1 * | 11/2004 | Macglashan ........ H01M 2/1626 429/247 |
| 2004/0242794 | A1 | 12/2004 | Kanazawa |
| 2005/0273031 | A1 * | 12/2005 | Ueno .................. A61L 33/0082 604/6.08 |
| 2007/0196638 | A1 | 8/2007 | Wei et al. |
| 2009/0191397 | A1 * | 7/2009 | Thottupurathu ........... 428/304.4 |
| 2010/0015869 | A1 | 1/2010 | Hartmann et al. |
| 2011/0020917 | A1 | 1/2011 | Wen et al. |
| 2011/0077477 | A1 * | 3/2011 | Romey .............. A61B 5/14532 600/309 |
| 2011/0120307 | A1 | 5/2011 | Ding et al. |
| 2011/0223486 | A1 | 9/2011 | Zhang et al. |
| 2012/0021223 | A1 * | 1/2012 | Griffiths et al. .............. 428/407 |
| 2012/0070648 | A1 | 3/2012 | Thottupurathu |

FOREIGN PATENT DOCUMENTS

| | | |
|---|---|---|
| WO | WO 00/43433 A1 | 7/2000 |
| WO | WO 2005/019518 A1 | 3/2005 |
| WO | WO 2006/075183 A2 | 7/2006 |
| WO | WO 2007/001405 A2 | 1/2007 |
| WO | WO 2008/023170 A1 | 2/2008 |
| WO | WO 2010/100410 A1 | 9/2010 |
| WO | WO 2010/100413 A2 | 9/2010 |

OTHER PUBLICATIONS

Zhang, S., A review on the separators of liquid electrolyte Li-ion batteries, Journal of Power Sources 164 (2007) 351-364.*
Knaus S., Surface and Bulk Modification of Polyolefins by Functional Aryl Nitrenes as Highly Reactive Intermediates Macromol. Symp. 176, 223-232 (2001).*
Flexcon, "Adhesive Solutions to the Challenges of Bonding to Low Surface energy Surfaces", <http://www.flexcon.com/~/media/Files/PDFs/Website/Fabricator_Products/White%20Papers/lowsurfaceenergybondingwhitepap er.ashx>, accessed May 29, 2014.*
Ye, W., Xin, J. H., Li, P., Lee, K.-L. D. and Kwong, T.-L. (2006), Durable antibacterial finish on cotton fabric by using chitosan-based polymeric core-shell particles. J. Appl. Polym. Sci., 102: 1787-1793. doi:10.1002/app.24463.*
R.B. Darling, "EE-527: MicroFabrication—Negative Photoresists," Slide Show.
J. Herbert Hall, et al., "Evidence for the Involvement of triplet phenyl nitrene in intermolecular C—H insertion," Journal of the American Chemical Society, ACS Publications, (vol. 90 ), (Issue. 19), (p. 5313-5314), (Sep. 1968).
Chang-Liang Sun et al., "Direct C—H Transformation via Iron Catalysis," Chemical Reviews, American Chemical Society, (p. A-T), (Jun. 30, 2010).
Haixia Lin, et al., "A Facile Procedure for the Generation of Dichlorocarbene from the Reaction of Carbon Tetrachloride and Magnesium using Ultrasonic Irradiation," Molecules, 2003 ed., (Issue. 8), (p. 608-613), (Jul. 31, 2003).
Karim M. Awenat, et al., "A chemical method for the convenient surface functionalisation of polymers," Chemical Communication Journal, 2005 ed., The Royal Society of Chemistry, (p. 990-992).
N. K. Boaen and Marc A. Hillmyer, "Post-polymerization functionalization of polyolefins," Chemical Society Reviews, 2005 ed., The Royal Society of Chemistry, (vol. 34), (p. 267-275), (Jan. 28, 2005).
R.L. Danheiser et al., "Aromatic Annulation Strategy for the Synthesis of Angularly-Fused Diterpenoid Quinones. Total Synthesis of (+)-Neocryptotanshinone, (−)-Cryptotanshinone, Tanshinone IIA, and (±)-Royleanone," J. Org. Chem, American Chemical Society, (vol. 60), (p. 8341-8350), (1995).
G. Smolinsky et al., "Nitrene Insertion into a C—H Bond at an Asymmetric Carbon Atom with Retention of Optical Activity. Thermally Generated Nitrenes," Thermally Generated Nitrenes, The Bell Telephone Laboratories, Inc. (Murray Hill, NJ), (vol. 86), (p. 3085-3088), (Aug. 5, 1964).
D.S. Breslow et al., "Nitrene Insertion Selectivities. The Reaction of Ethyl Azidoformate with Saturated Chemical Cyclic Hydrocarbons," Saturated Cyclic Hydrocarbons, Journal of the American Chemical Society, (vol. 90), (Issue. 25), (p. 7097-7102), (Dec. 4, 1968).
Doyle et al., "Catalytic Carbene Insertion into C—H Bonds," Chem. Rev., American Chemical Society, (vol. 110), (No. 2) (p. 704-724), (2010).
W. Von E. Doering et al., "Comparative Reactivity of Methylene, Carbomethoxycarbene and Bis-carboethoxycarbene toward the Saturated Carbon-Hydrogen Bond," Hickrill Chemical Research Lab. (Katonah, NY), p. 1989-1992, (1961).
D.F. Taber et al., "Mesyl Azide: A Superior Reagent for Diazo Transfer," J. Org. Chem, American Chemical Society, p. 4077-4078, (Mar. 10, 1986).
J.H. Boyer et al., "Reactions of Sodium Phenylacetylide and Sodium Alkoxide with Tosyl and Mesyl Azides," Notes, p. 1051-1053, (Jul. 1958).
G.T. Rice, "Transition Metal Mediated Nitrene C—H Insertion," p. 1-8, (Mar. 10, 2008).
P. Müller et al., "Enantioselective Catalytic Aziridinations and Asymmetric Nitrene Insertions into CH Bonds," Chem. Rev., American Chemical Society, p. 2905-2919, (Jun. 26, 2003).
M. Yan et al., "Covalent immobilization of polypropylene thin films," Journal of Materials Chemistry 2005, 15 ed., The Royal Society of Chemistry 2005, p. 523-527, (Nov. 2005).
G.A. McFarren et al., "Azidosilane Polymer-Filler Coupling Agent," Polymer Engineering and Science, vol. 17 ( No. 1), p. 46-49, (Jan. 1977).
L. Gonzalez et al., "Applications of an Azide Sulfonyl Silane as Elastomer Crosslinking and Coupling Agent," John Wiley & Sons, Inc., p. 1353-1359, (1997).
M. Eason, et al., "A new class of adhesion promoter for inert & low surface energy materials," Presentation, Oxford Advanced Surfaces Group PLC, (Oct. 2009).
"Technology Platforms Molecular Thin Layers," Website, OxfordSurfaces.com/content/onto/platforms, Oxford Advanced Surfaces Group PLC, (2009).

(56) References Cited

OTHER PUBLICATIONS

G.K. Raghuraman et al., "Attachment of Polymer Films to Solid Surfaces via Thermal Activation of Self-assembled Monolayers Containing Sulphonyl Azide Group," Langmuir Article, American Chemical Society, 26(2), (2010), pp. 769-774.

\* cited by examiner

Nitrene Generation

Carbene Generation

Insertion Mechanism

SURFACE MODIFIED POLYMERIC MATERIALS, MODIFIED FUNCTIONALIZED POLYMERS, FUNCTIONAL POLYMERS, AND METHODS

CROSS-REFERENCE TO RELATED APPLICATIONS

The present application claims priority to and the benefit of each of U.S. provisional patent application Ser. No. 61/508,725 filed Jul. 18, 2011, and U.S. provisional patent application Ser. No. 61/547,812 filed Oct. 17, 2011, both of which are hereby fully incorporated by reference herein.

FIELD OF THE INVENTION

The instant invention is directed to surface modified polymeric materials, modified functionalized polymers, functional polymers, chemically modified substrates including modified functionalized polymers, methods of making and/or using surface modified polymeric materials, modified functionalized polymers, functional polymers, and/or chemically modified substrates including modified functionalized polymers, methods of modifying a functionalized polymer and/or methods of using modified functionalized polymers to chemically react with the surface of a substrate, and/or methods of using such chemically modified substrates. At least certain embodiments are directed to modified functionalized polymers, functional polymers, and methods of modifying functionalized polymers for chemically modifying porous and/or nonporous polymer substrates and/or methods of using such modified substrates. At least selected embodiments are directed to modified functionalized polymers, functional polymers, and methods of modifying functionalized polymers for chemically modifying porous and/or microporous polymer substrates and methods of using such modified substrates. At least certain embodiments are directed to modifying certain functionalized polymers to enable them to effect a change in the surface property of a substrate. In accordance with at least selected possibly preferred embodiments, the invention is directed to using a carbene and/or nitrene crosslinking modifier to chemically modify a functionalized polymer to form a modified functionalized polymer which can chemically modify the surface of a substrate and effect a change in the surface properties of the substrate for an intended application. In accordance with at least selected possibly preferred embodiments, the invention is directed to using a carbene and/or nitrene crosslinking modifier (component B) to covalently modify a polymeric surface with a functionalized polymer (component A). Such a modification may alter the chemical reactivity of the polymeric surface enabling the modified substrate to have a specifically designed functionality for an intended end use or application.

BACKGROUND OF THE INVENTION

Various methods exist to modify the physical or chemical nature of surfaces of polymeric materials. Certain known modifications of surfaces of polymeric materials are often fugitive and fail to permanently modify the polymer substrate for a variety of end use applications.

One such known method is a treatment or pre-treatment of the surface of the polymer substrate, for example using ultraviolet light, plasma, or corona treatment. Such treatments may be harsh, particularly for thin films and certain polymer classes. Using these methodologies may cause a risk of mechanical or chemical damage to the surface of the polymer substrate. Damage, in some cases, can compromise the performance of the modified polymer substrate for its intended end use application.

Thus there exists a need for improved methods to modify the physical and/or chemical nature of surfaces of polymeric materials. In particular, a need exists for improved or novel methods for permanently modifying a polymer substrate for a variety of end use applications, surface modified polymeric materials, modified functionalized polymers, functional polymers, uses of such materials, and the like.

SUMMARY OF THE INVENTION

In accordance with at least selected embodiments, the present invention may provide or at least address the need for improved methods to modify the physical and/or chemical nature of surfaces of polymeric materials, for improved or novel methods for permanently modifying the polymer substrate for a variety of end use applications, for surface modified polymeric materials, for modified functionalized polymers, for functional polymers, uses of such materials, and the like.

At least certain embodiments of the present invention may address the above needs and are directed to modified functionalized polymers, functional polymers and chemically modified substrates including modified functionalized polymers, methods of modifying a functionalized polymer and/or methods of using modified functionalized polymers to chemically react with the surface of a substrate, and/or methods of using such chemically modified substrates.

More particularly, at least certain embodiments are directed to modifying certain functionalized polymers to enable them to effect a change in the surface property of a substrate. In accordance with at least selected preferred embodiments, the invention is directed to using preferably a carbine, nitrene or combined carbine and nitrene crosslinking modifier (component B or modifier component B) or precursor thereof, to chemically modify a functionalized polymer (component A or functionalized component A) to form a modified functionalized polymer A-B which can then chemically modify the surface of a polymer substrate and effect a change in the surface properties of the polymer substrate for an intended application, product, process, or end use. A carbene (R—C:) is any member of a class of highly reactive molecules containing divalent carbon atoms, that is, carbon atoms that utilize only two of the four bonds they are capable of forming with other atoms with no associated ionic charge. A nitrene (R—N:) is the nitrogen analogue of a carbene and has only six valence electrons. Nitrenes and carbenes are reactive intermediates that can be reacted with a functional component A to form a special chemical species referred to herein as a 'modified functionalized polymer A-B' which is capable of reacting with a polymer substrate resulting in the attachment of a specific chemical functionality to the polymer substrate and tailoring the chemical structure or properties of the polymer substrate specifically for an intended end use.

The chemical reaction of a modified functionalized polymer A-B that has a specific chemical functionality with the polymeric surface of the substrate would result in a permanent modification (chemical modification) of the polymeric surface of the substrate. More specifically, reacting functionalized component A with modifier component B can generate a modified functionalized polymer A-B which is capable of acting as an adhesion promoter/demoter agent.

The chemical reaction of a modified functionalized polymer A-B that has a specific chemical functionality with the polymeric surface of the substrate would result in a permanent modification of the polymeric surface of the substrate. More specifically, reacting functionalized component A with modifier component B can generate a modified functionalized polymer A-B which is capable of acting as an adhesion promoter/demoter agent which then can chemically bond to the surface of the polymer substrate and change the surface energy of the polymer substrate leading to enhanced adhesion properties in adhesive or lamination applications.

Still more specifically, the modified functionalized polymer A-B can covalently modify a polymer substrate which has a lower or higher surface energy that counteracts the direct attachment of functional component A. More specifically, modified functionalized polymer A-B can modify the polymer substrate which has a polarity that limits and/or prevents the direct attachment of functional polymer A. More specifically, the modified functionalized polymer A-B can modify the polymer substrate which has a surface that is hydrophilic or hydrophobic which can limit and/or prevent the direct attachment of functional component A. Still more specifically, modified functionalized polymer A-B can modify the polymer substrate which has a surface that is oleophilic or oleophobic which can limit and/or prevent the attachment of functional component A.

Yet more specifically, the modified functionalized polymer A-B can modify a polymer substrate by changing its surface energy. More specifically, the modified functionalized polymer A-B can be used to increase or decrease the effective surface energy of the polymer substrate to improve its compatibility with, for example, coatings, materials, adjoining layers, or the like.

More specifically, modified functionalized polymer A-B can modify the polymer substrate which has a polarity that limits and/or prevents the direct attachment of functional polymer A, can modify the polymer substrate which has a surface that is hydrophilic or hydrophobic which can limit and/or prevent the direct attachment of functional component A, or can modify the polymer substrate which has a surface that is oleophilic or oleophobic which can limit and/or prevent the attachment of functional component A.

At least certain selected embodiments of the present invention address the above described needs and are directed to modified functionalized polymers, functional polymers and chemically modified substrates including modified functionalized polymers, methods of modifying a functionalized polymer and/or methods of using modified functionalized polymers to chemically react with the surface of a substrate, and/or methods of using such chemically modified substrates. At least certain embodiments are directed to modified functionalized polymers, functional polymers, and methods of modifying functionalized polymers for chemically modifying porous and nonporous polymer substrates and methods of using such modified substrates. At least selected embodiments are directed to modified functionalized polymers, functional polymers, and methods of modifying functionalized polymers for chemically modifying porous and microporous polymer substrates and methods of using such modified substrates.

At least certain selected embodiments of the present invention address the need to modify the surface of porous polymeric substrates. At least selected embodiments of the present invention address the above need and/or are directed to modified porous polymeric membrane substrates, methods of making modified polymeric porous membrane substrates, and/or methods of using modified polymeric porous membrane substrates, chemically modified polyolefin microporous membranes, methods of making chemically modified polyolefin microporous membranes, and/or methods of using chemically modified polyolefin microporous membranes, chemically modified polyolefin microporous battery separators or battery separator membranes, methods of making chemically modified polyolefin microporous battery separators or battery separator membranes, and/or methods of using chemically modified polyolefin microporous battery separators or battery separator membranes, chemical modification of polyolefin microporous battery separators or separator membranes by the reaction of the modified functionalized polymer A-B which contains the carbene and/or nitrene intermediate with the carbon-hydrogen bonds of the polyolefin to form carbon-carbon or covalent bonds with the polyolefin, methods of improving the hydrophilicity or wettability of the polyolefin microporous battery separators or separator membranes in lithium-ion rechargeable batteries, and/or methods of introducing crosslinking into the polyolefin microporous battery separators or separator membranes, and/or the like.

In accordance with at least selected possibly preferred embodiments of the invention, chemical modification of at least a portion of the surface of polyolefin microporous separators or membranes can be accomplished by the functionalized polymer A containing the carbene and/or nitrene intermediate with, for example, the carbon-hydrogen bonds of the polyolefin. This chemical reaction or treatment based on functionalized polymer A (component A or functionalized component A) containing the carbene and/or nitrene intermediate provides a method of more permanently improving the wettability of polyolefin microporous separators in lithium-ion rechargeable batteries. In addition, the preferred reaction of functionalized polymer A containing the carbene and/or nitrene intermediate with the C—C and C—H bonds in at least a surface layer of polyolefin microporous separator membranes can be used to introduce a crosslinking functionality into the polyolefin which can be used to improve the high temperature stability of the polyolefin microporous separators or membranes.

In accordance with at least certain selected embodiments, the present invention addresses the need to modify the surface of porous polymeric substrates. At least selected embodiments of the present invention address the above need and are directed to modified porous polymeric membrane substrates, methods of making modified polymeric porous membrane substrates, and methods of using modified polymeric porous membrane substrates. More particularly, the invention is directed to chemically modified polyolefin microporous membranes, methods of making chemically modified polyolefin microporous membranes, and methods of using chemically modified polyolefin microporous membranes. Still more particularly, the invention is directed to chemically modified polyolefin microporous waterproof/breathable textile membranes, methods of making chemically modified polyolefin microporous waterproof/breathable textile membranes, and methods of using chemically modified polyolefin microporous waterproof/breathable textile membranes. In accordance with at least selected preferred embodiments, the invention is directed to chemical modification of polyolefin microporous waterproof/breathable textile membranes by the reaction of the modified functionalized polymer A-B which contains the carbene and/or nitrene intermediate with the carbon-hydrogen bonds of the polyolefin, methods of decreasing the surface energy or imparting oleophobicity to waterproof/breathable textile membranes to improve the fouling resistance of waterproof/ breathable textiles and/or improve the durability of the membranes' waterproofness, and/or the like.

In accordance with at certain selected embodiments, the present invention addresses the need to modify the surface of polymeric textile fibers. At least selected embodiments of the present invention address the above need and are directed to modified polymeric textile fibers, methods of making modified polymeric textile fibers, and methods of using modified polymeric textile fibers. More particularly, the invention is directed to chemically modified polyolefin textile fibers, methods of making chemically modified polyolefin textile fibers, and methods of using chemically modified polyolefin textile fibers. In accordance with at least selected possibly preferred embodiments, the invention is directed to chemical modification of polymeric textile fibers by the reaction of the modified functionalized polymer A-B which contains the carbene and/or nitrene intermediate with the carbon-hydrogen bonds of the polymeric textile fibers, methods of decreasing the surface energy or imparting oleophobicity to polymeric textile fibers to improve the fouling resistance of polymeric textile fibers and/or improve the durability of the textile fibers' waterproofness, and/or the like.

At least certain objects, embodiments, aspects, and/or examples of the instant invention are directed to surface modified polymeric materials, modified functionalized polymers, functional polymers, chemically modified substrates including modified functionalized polymers, methods of making and/or using surface modified polymeric materials, modified functionalized polymers, functional polymers, and/or chemically modified substrates including modified functionalized polymers, methods of modifying a functionalized polymer and/or methods of using modified functionalized polymers to chemically react with the surface of a substrate, and/or methods of using such chemically modified substrates. At least certain embodiments are directed to modified functionalized polymers, functional polymers, and methods of modifying functionalized polymers for chemically modifying porous and/or nonporous polymer substrates and/or methods of using such modified substrates. At least selected embodiments are directed to modified functionalized polymers, functional polymers, and methods of modifying functionalized polymers for chemically modifying porous and/or microporous polymer substrates and methods of using such modified substrates. At least certain embodiments are directed to modifying certain functionalized polymers to enable them to effect a change in the surface property of a substrate. In accordance with at least selected possibly preferred embodiments, the invention is directed to using a carbene and/or nitrene crosslinking modifier to chemically modify a functionalized polymer to form a modified functionalized polymer which can chemically modify the surface of a substrate and effect a change in the surface properties of the substrate for an intended application. In accordance with at least selected possibly preferred embodiments, the invention is directed to using a carbene and/or nitrene crosslinking modifier (component B) to covalently modify a polymeric surface with a functionalized polymer (component A). Such a modification may alter the chemical reactivity of the polymeric surface enabling the modified substrate to have a specifically designed functionality for an intended end use or application.

At least certain objects, embodiments, aspects, and/or examples of the instant invention are directed to improved or novel methods for permanently modifying a polymer substrate for a variety of end uses or applications, surface modified polymeric materials, modified functionalized polymers, functional polymers, uses of such materials, and/or the like.

Other objects, embodiments, aspects, or examples of the present invention may be shown or described in the drawings, the detailed description or the claims.

BRIEF DESCRIPTION OF DRAWINGS

FIG. 1 illustrates the chemical reactions showing R/R' groups modified to tailor surface characteristics of a polyolefin, such as the surface of a polyolefin substrate, for example, the R/R' groups can be modified to tailor surface characteristics such as wetting.

DETAILED DESCRIPTION OF THE INVENTION

Figure 1:
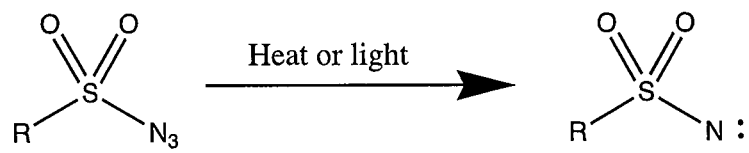
FIG. 1 is a formulaic reaction illustration of nitrene generation, carbine generation, and the insertion mechanism or reaction in accordance with at least selected possibly preferred embodiments of the present invention. For example.
Figure 1:
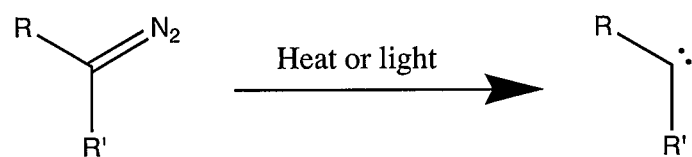
Figure 1:
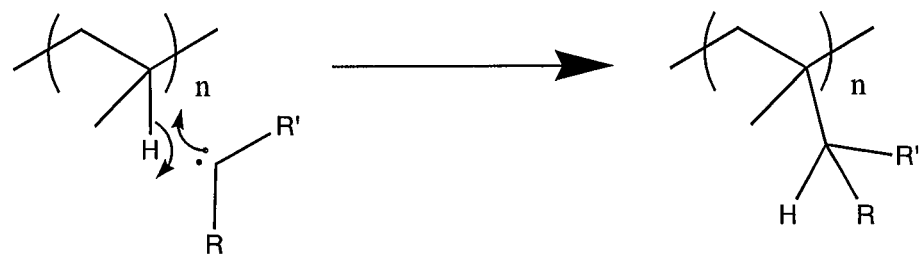

At least certain embodiments of the present invention may address the above needs and/or are directed to new, improved, or modified surface modified polymeric materials, modified functionalized polymers, functional polymers, and/or chemically modified substrates including modified functionalized polymers, and/or methods of modifying a functionalized polymer and/or methods of using modified functionalized polymers to chemically react with the surface of a substrate, and/or methods of using such chemically modified substrates.

More particularly, certain embodiments are directed to modifying certain functionalized polymers to enable them to effect a change in the surface property of a substrate. In accordance with at least selected preferred embodiments, the invention is preferably directed to using a carbene and/or nitrene crosslinking modifier (component B or modifier component B) to chemically modify a functionalized polymer (component A or functional or functionalized component A) to form a modified functionalized polymer A-B which can then chemically modify the surface of a polymer substrate and effect a change in the the surface properties of the polymer substrate for an intended application.

A carbene (R—C:) is any member of a class of highly reactive molecules containing divalent carbon atoms, that is, carbon atoms that utilize only two of the four bonds they are capable of forming with other atoms. A nitrene (R—N:) is the nitrogen analogue of a carbene and has only 6 valence electrons. Nitrenes and carbenes are reactive intermediates that may have unique reactivity towards both functional and nominally nonfunctional substrates. Although there may be methods available to modify certain functional polymeric substrates, the current invention provides a method well suited to modify those polymeric substrates that are nonfunctional, that is, they do not contain functional groups. Most polyolefins are essentially "nonfunctional" as they do not readily accept modification without significant consequences to the mechanical or chemical stability of the material. Carbene and/or nitrene based intermediates provide an opportunity to modify nonfunctional polyolefins without the severe degradation that typically occurs with many conventional surface modification approaches. Furthermore, the use of carbene, nitrene or combined carbene and nitrene based intermediates of the present invention may provide opportunities that can be applied to most, if not all polymeric substrates without regard for chemical modification that is specific to a functional group. The reactive carbene and/or nitrene based intermediates of the present invention have the advantage of being capable of inserting themselves into carbon-hydrogen chemical bonds of a polyolefin polymeric substrate. The special chemical reactivity of carbene and/or nitrene based intermediates allows functional component A-B to react with "nonfunctional" materials providing a means to attach component A to the polymer substrate.

In accordance with one example of the present invention, modifier component B with a plurality of carbene and/or nitrene intermediates or precursors can be mixed with one or more desired functional component A's to form a special chemical species referred to herein as a 'multiple reactive site modified functionalized polymer A-B'. Given the appropriate ratio and formulation conditions, this coacervate is capable of further reacting with a given polymer substrate that could be polyolefinic in nature, or some other synthetic or naturally derived polymer material resulting in the attachment of a specific, desired chemical functionality to the polymer substrate that tailors the chemical structure of the polymer substrate specifically for an intended end use.

The chemical reaction of a modified functionalized polymer A-B that has a specific chemical functionality with the polymeric surface of the substrate may result in a permanent, covalent modification of a desired polymeric surface with the chemical functionality of component A. In accordance with the present invention, one example is a polyolefinic substrate modified with a poly(ethylene oxide) polymer or oligomer (example component A). A component B having a plurality of carbene and/or nitrene generating species can act as a tether between a polyolefin surface and a poly(ethylene oxide) component A. The resulting composite material (polyolefin substrate with functionalized component A-B) has bulk properties resembling the polyolefin substrate, but with the surface properties of poly(ethylene oxide). For instance, the post modified polyolefin surface may appear to have a much higher surface energy than normal polyolefin, approaching that of a typical poly(ethylene oxide) substrate surface, depending on the quality and extent of modification. Applications for such functionalized component A-B modified polymeric substrates of the present invention include for example, enhanced wettability of battery separator materials, anti-fouling, and adhesion promotion for certain coatings, materials, layers, or treatments among others.

Other polymeric materials that could be used as a component A in the functionalized component A-B modified polymeric substrate may preferably include materials with different surface properties than the base substrate. For example, a particular antifouling application may require a fluorinated functional component A. Utilizing fluorinated polymers or oligomers as functional component A, polymer substrate surfaces can be obtained that have properties similar to fluorinated materials with respect to hydrophobic or oleophobic behavior that do not suffer the same bulk mechanical disadvantages as the bulk fluorinated materials.

In accordance with one example of the present invention, this concept can be extended to other substrates such as polyamide substrates commonly used for carpeting or textile applications. Certain known finishes for polyamide substrates typically have very little chemical functionality to facilitate attachment. Other typical covalent modifications could prove detrimental to the bulk properties of the material and lead to degraded end use properties of the polyamide substrate. The carbine and/or nitrene tether concept of the present invention can add standard textile finishes to these types of polyamide substrates.

In accordance with at least selected embodiments of the present invention, microporous polyolefin membrane substrates can be modified with selected functionalized components A-B to exclude various materials such as alcohols, aliphatics and aromatic compounds. Microporous polyolefin membranes tend to absorb significant amounts of oil within their pores. The present functionalized component A-B treatment or modification can be used to modify the surface of microporous polyolefin membranes to exclude materials such as alcohols, aliphatics or aromatic compounds, thereby creating modified substrates for use in new types of separations.

In accordance with at least selected embodiments of the present invention, applications also exist to lower the surface energy of microporous polyolefin membranes using a functionalized component A-B. The comfort of waterproof outerwear can be greatly improved by making the garment more breathable to enable the body moisture of the wearer to evaporate through the fabric of the waterproof outerwear. This functionality is commonly referred to as "waterproof/breathable" outerwear. Many waterproof/breathable garments incorporate non-porous materials that rely on molecular transport of water molecules to achieve breathability. There is a need to provide improved breathability by incorporating truly porous membranes that allow water vapor molecules to evaporate through diffusion in air, thus greatly increasing breathability and enhancing wearer comfort. One disadvantage of certain microporous membranes is they can become fouled by natural body oils or other oils resulting in a reduction in the waterproof performance of the membrane. This disadvantage can be overcome using the present invention to modify the surface of the microporous membrane, for example, with a fluorinated compound, to make the membrane surface oleophobic and resistant to fouling by natural body oils or other oils.

In accordance with at least selected embodiments of the present invention, applications also exist to lower the surface energy of polymeric textile fibers and/or fabrics using a functionalized component A-B. The waterproof performance and/or stain resistance of polymeric textile fibers and fabrics is often achieved through the application of durable water repellent ("DWR") coatings and finishes. These DWR coatings and finishes have poor durability and wear off due to repeated washing and/or use. Some textile fibers and/or fabrics, for example those made of acrylic, are less readily treated with DWR coatings and often are not used in applications where water and/or stain resistance is important. At least certain methods or embodiments of the present invention can be used to modify polymeric textile fibers and/or fabrics, for example using a fluorinated compound, to make the polymeric textile fibers and/or fabrics permanently waterproof and/or stain resistant.

Furthermore, in accordance with at least selected embodiments of the present invention, functionalized component A-B can be used to reduce the surface energy of a polyolefin membrane used in the wall of certain fragrance container devices. Certain fragrance container devices function through the controlled release of a fragrance material through the wall or walls of a fragrance container device. The fragrance container device can typically consist of a polyolefin and is often made of polyethylene. However, the release rate of the fragrance through the polyolefin membrane wall of the fragrance container device can be limited by the non-porous nature of the polyolefin membrane. Consequently, the fragrance container device must be made larger in size and/or the concentration of the fragrance in the fragrance container device must be increased in order to achieve the desired release rate of fragrance.

There is an economic need to use less fragrance in such fragrance container devices while achieving the desired fragrance release rate. For this reason, use of a microporous polymeric membrane as the wall material in a fragrance container device or container would facilitate the movement of fragrance through the membrane wall of the fragrance container device at a much more rapid rate. However, the use of microporous polyolefin membranes in fragrance container device applications has been limited by the tendency of the fragrance oils to leak through the membrane wall of the container. This disadvantage can be overcome by using the present invention to modify the surface energy of the microporous membrane, for example, by using a fluorinated functionalized polymer A-B to make the membrane or wall of the fragrance container device oleophobic and resistant to leakage of the fragrance oils.

In accordance with at least selected embodiments of the present invention, the modified functionalized polymer A-B can modify a polymer substrate which has a lower or higher surface energy that counteracts the direct attachment of functional component A. More specifically, modified functionalized polymer A-B can covalently modify the polymer substrate which has a polarity that limits and/or prevents the direct attachment of functional polymer A. More specifically, the modified functionalized polymer A-B can modify the polymer substrate which has a surface that is hydrophilic or hydrophobic which can limit and/or prevent the direct attachment of functional component A. Still more specifically, modified functionalized polymer A-B can modify the polymer substrate which has a surface that is oleophilic or oleophobic which can limit and/or prevent the attachment of functional component A.

At least certain embodiments of the present invention are directed to the placement of a specific chemical functionality in modified polymer A which will enable functionalized polymer A to act as an adhesion promoter or demoter to chemically react with the surface of a substrate. In accordance with at least selected possibly preferred embodiments, the invention is directed to modifying functionalized polymer A with a carbene and/or nitrene intermediate which includes a crosslinking group. The incorporation of a crosslinking functional group enables functionalized polymer component A to act as an adhesion promoter or demoter polymer agent which can chemically modify the surface of a substrate resulting in a durable or nonfugitive change to the surface of the substrate.

At least certain embodiments are directed to modifying certain functionalized polymers for the purpose of changing surface energy of the polymer substrate. This can lead to enhanced adhesion properties for adhesive or lamination applications, in particular, for cases in which other adhesion promotion techniques could be detrimental to the mechanical or chemical stability of the substrate.

At least certain embodiments are directed to modifying certain functionalized polymers with a single carbene and/or nitrene component B or with a mixture of multifunctional carbene and/or nitrene component Bs for the purpose of including biologically derived polymers and small molecules for end use applications that may require biological detection or assaying. Proteins, DNA, RNA, naturally occurring polysaccharides, or other biologically relevant materials can be used for these types of applications.

Modifications of the surface of the polymer substrate can be made for the purpose of changing its functionality. For example, a nominally chemically inert polymer substrate can be modified by decorating the surface of the substrate with functional groups added by modified functional component A-B which is designed to participate in a secondary post treatment reaction to modify a polymer substrate. Such a change alters the functionality of the polymer substrate for an intended end use application. An example of such a post treatment reaction is a textile end use application in which the surface of a textile substrate has been reacted with modified component A-B so it can accept standard textile dying chemical and procedures to generate substantially different end results.

The polymer substrate can consist of any synthetic or natural polymer or copolymer such as olefinic, styrenic, silicone, urethane, acrylate, ester, vinyl, cellulosics, amides, aramids, ethers, or co-polymers, blends and/or mixtures of such. Additionally, the polymer substrate can also be a cross linked network material, such as phenol-formaldehyde resin or rubber-type materials such as butadiene, isoprene, and neoprene. Additionally, the polymer substrate can be a halogen-containing polymer such as Polytetrafluoroethylene (PTFE), Polyvinylidene fluoride (PVDF), Polyvinylidene Dichloride (PVDC), and Polyvinyl chloride (PVC).

The chemical structure of functional polymer A contains the desired surface functional group required by the polymer substrate in the end use application. Functional polymer A can consist of similar polymers as the polymer substrate. In addition, functional polymer A can consist of polyamines, polyols, polyamides, and blends, mixtures or co-polymers of such.

In accordance with at least selected preferred embodiments, the invention is directed to using as Component B a multifunctional material (f>2.0) that has pendant functional groups tailored to generate carbene and/or nitrene species in situ. Component A and component B are chemically reacted to produce the active chemical species which can react with the surface of the polymer substrate enabling the modified polymer substrate to be useful in the intended end use application.

The ratio between component A and component B can be varied to generate optimal performance properties in the end use application. Typical component A/component B application ratios could range from about 1.0 to 200.0, depending on desired surface properties, intended end use application of the polymer substrate, and the reactivity of component A with component B.

At least certain embodiments are directed to modifying certain functionalized polymers for the purpose of including biologically derived polymers and small molecules for applications that may require biological detection or assaying. Proteins, DNA, RNA, naturally occurring polysaccharides, or other biologically relevant materials can be used for these types of applications.

At least certain embodiments are directed to modifying the surface of a polymer substrate with a mixture of multifunctional carbene and/or nitrene precursor component B which has been reacted with a desired component A functional synthetic polymer, small molecule, or biologically active surface modifying agent.

Modifications of the surface of the polymer substrate can be made for the purpose of changing its functionality. For example, a nominally chemically inert polymer substrate can be modified by decorating the surface of the substrate with functional groups added by functional component A or indirectly by modifying the 'component A-modified polymer substrate' in a secondary post treatment reaction. Such a change alters the functionality of the polymer substrate for an intended end use application. An example of such a post treatment reaction is a textile end use application in which the surface of a textile substrate has been reacted with modified component A-B so it can accept standard textile dying chemical and procedures to generate substantially different end results.

At least selected embodiments of the present invention are directed to modified porous membranes, methods of making modified porous membranes, and methods of using modified porous membranes. More particularly, the invention is directed to chemically modified polyolefin microporous membranes, methods of making chemically modified polyolefin microporous membranes, and methods of using chemically modified polyolefin microporous membranes. Still more particularly, the invention is directed to chemically modified polyolefin microporous battery separators or battery separator membranes, methods of making chemically modified polyolefin microporous battery separators or battery separator membranes, and methods of using chemically modified polyolefin microporous battery separators or battery separator membranes.

In accordance with at least selected preferred embodiments, the invention is directed to chemical modification of polyolefin microporous battery separators or separator membranes by the chemical reaction of carbene and/or nitrene intermediates with the carbon-hydrogen bonds of the polyolefin, methods of improving the hydrophilicity or wettability of the polyolefin microporous battery separators or separator membranes in lithium-ion rechargeable batteries, methods of introducing crosslinking into the polyolefin microporous battery separators or separator membranes, and/or the like.

In accordance with at least selected preferred embodiments of the invention, chemical modification of at least a portion of the surface of polyolefin microporous separators or separator membranes can be accomplished by the chemical reaction of carbene and/or nitrene intermediates with the carbon-hydrogen bonds of the polyolefin. This chemical reaction or treatment based on carbene and/or nitrene intermediates provides a method of more permanently improving the wettability of polyolefin microporous separators in lithium-ion rechargeable batteries. In addition, the preferred reaction of carbene and/or nitrene intermediates with the C—C and C—H bonds in at least a surface layer of polyolefin microporous separator membranes can be used to introduce crosslinking into the polyolefin which can improve the high temperature stability of the polyolefin microporous separators or membranes.

An exemplary battery separator may be a single layer, multiple layer or multiple-ply battery separator made of one or more layers or plies of polyolefin porous membrane or film. The microporous membrane may be a symmetric membrane or an asymmetric membrane. The membrane may be made from one or more polyolefin polymers or blends including, but not limited to, polyethylene (PE, including LDPE, LLDPE, and HDPE), ultra high molecular weight polyethylene (UHMWPE), polypropylene (PP), polymethylpentene (PMP), copolymers of any of the foregoing, and mixtures thereof. The membrane may be made by any suitable process including, but not limited to, a dry stretch process (also known as the CELGARD process) or a solvent process (also known as the gel extrusion or phase separation or extraction or wet process) or a netting (or aperture) process (the film is cast onto a chilled roll, the roll has a pattern that is embossed onto the film, subsequently the embossed film is stretched (MD/TD), whereby large pores are formed along the embossed pattern). The membrane preferably has the necessary characteristics to operate as a battery separator in a battery such as a lithium battery, more preferably a rechargeable lithium-ion battery, or the like. The chemically modified membrane of the present invention may be the outer layer of a tri-layer membrane (e.g., PP/PE/PP or PE/PP/PE) or other multi-layer membrane or separator such as a tri-layer shutdown separator.

Polyolefins are a class or group of thermoplastic polymers derived from simple olefins. Polyolefins generally include polyethylene, polypropylene, polybutylene, polymethyl pentene, and copolymers thereof. Polyolefin articles generally include fibers and films, but also include microporous films and microporous hollow fibers. Microporous refers to an article which has a plurality of pores with effective diameters of 1 micron or less. Hydrophobic polyolefins refer to polyolefins having surface energies equivalent to or less than the surface energy of polyethylene.

In accordance with at least certain embodiments, a polyolefin article is made more hydrophilic or wettable by chemical modification of at least a portion of the surface of the polyolefin article, such as a microporous separator or membrane by the chemical reaction of carbene and/or nitrene intermediates with the carbon-hydrogen bonds of the polyolefin. In addition, the preferred reaction of carbene and/or nitrene intermediates with the C—C and C—H bonds in at least a surface layer of the polyolefin article can be used to introduce crosslinking into the polyolefin which can improve the high temperature stability, the strength, and/or the like. The foregoing hydrophilic polyolefin articles may be used in any application where a hydrophilic polyolefin is necessary or desirable, for example, air filtration, air cleaning, water filtration, water cleaning, water purification, medical equipment, separation equipment, semiconductor manufacture, battery cell separator, ultrafiltration equipment, and the like.

With regard to battery or cell separators, the chemical treatment is applied to one or preferably both surfaces of the microporous polyolefin membrane. This treated separator is particularly suitable for lithium-ion secondary batteries.

With regard to the separation, filtration, cleaning, and purification equipment, particularly where microporous polyolefin hollow fibers or flat sheet membranes are used, higher flux rates are obtainable by use of the modified materials.

The microporous membrane is typically a hydrophobic, polyolefin polymer. Such polymers include, for example, polyethylene, polypropylene, and blends, mixtures or co-polymers thereof. The method of manufacturing the membrane is not critical, and may include, for example, the "dry" stretch (or Celgard) process or the "solvent" stretch (or phase inversion) process. Such membranes may have a thickness of about 75 microns or less. For cetain applications, dry process polypropylene membranes may be preferred.

Chemical modification of carbon-hydrogen and other bonds in polyolefins as a means to permanently modify the hydrophobic nature of polyolefins can be challenging due to the limited number of available chemical reactions. The carbon-hydrogen and carbon-carbon bonds are both very stable making it difficult to permanently modify polyolefins such as polypropylene and polyethylene. Polyolefins such as polypropylene and polyethylene are commonly used in microporous separator membranes in lithium-ion rechargeable batteries. An important performance property of polyolefin microporous separator membranes is easy wettability by the non-aqueous electrolyte solvents typically used in lithium-ion rechargeable batteries. Currently, various surfactants are applied as a coating to alter the hydrophobic nature of the polyolefin microporous separator membrane and increase its wettability by non-aqueous electrolyte solvents. Certain surfactant coatings may only provide temporary wettability since they are only physically adsorbed to the surface of the polyolefin microporous separator membrane.

In accordance with the present invention, a more permanent solution to providing wettability may utilize a chemical reaction to covalently attach surface modifying agents to the polyolefin microporous separator membrane. One of the few reactions that can react with carbon-hydrogen (C—H) bonds in polyolefins involves the use of carbene and/or nitrene intermediates. Carbene and nitrene intermediates are reactive intermediates of carbon and nitrogen, respectively, which have the ability to insert themselves into C—H bonds of a polyolefin either with or without the presence of a transition metal catalyst. FIG. 1 depicts the respective formation of carbene and nitrene intermediates from heat or light.

Transition metal catalysts are typically expensive, and should be readily recovered to make an economical process. There are some precursors that can provide carbene intermediates through heat, light, or through chemical reaction.

Carbene intermediates can be formed through thermolysis or photolysis of diazo compounds. A chemical reaction between a strong base and a compound prone to α-elimination (such as Methylene Chloride, Chloroform, Bromoform, etc.) can also produce carbene intermediates. Nitrenes are typically formed through thermo- or photolysis of azides (of particular importance are aryl azides and sulfonyl azides) and through the thermolysis of isocyanates. Thermal decomposition may tend to have more efficient insertion than other generation methods.

Once the reactive intermediate is formed, its lifetime is typically very short. When introduced to the surface of the polyolefin separator membrane in an appropriate timeframe, an insertion reaction such as that shown in FIG. 1 can occur. A polyolefin with a new functionality inserted into a C—H bond can be achieved through radical abstraction and recombination or through a concerted reaction. The surface properties of the polyolefin can be modified by the selection of the R and R' functional groups in the carbene and/or nitrene intermediate.

For example, if a diazo material is created with a long poly(ethylene gycol) tail, the resulting surface modification would demonstrate enhanced hydrophilicity, leading to enhanced wetting properties of the polyolefin separator membrane by very polar materials.

Producing a variety of hydrophilic molecules is not limited to only ethylene glycol oligomers and polymers. Further modifications could include hydroxyethyl acrylate, methacrylates, polyethyleneimines, modified celluloses or chitosan. These can be in oligomeric or polymeric form.

Carbene and/or nitrene surface treatment could also be accomplished with a wide variety of small molecule functional groups. Carboxylic acids, alcohols, thiols, amines (primary, secondary, tertiary, and quaternary), guanidinium, ethers, esters, and carbonates are functional groups that can produce some hydrophilic nature to a polyolefin microporous separator membrane.

A significant increase in the wettability of polypropylene microporous separator membranes by very polar electrolytes can be achieved through the present chemical modifications of the polypropylene microporous separator membrane allowing a broader range of current and future electrolytes that can be used in lithium-ion rechargeable batteries.

For example, the wetting properties of the substrate can be drastically modified based on the substitutions to the molecular additive. Perfluoro groups could impart superhydrophobic behavior, while polyethylene glycol) additions can increase water wettability. Poly(dimethylsiloxane) can be used to enhance the feel of the material by making the substrate more pleasant to the touch. Furthermore, surface or bulk crosslinking of the material with a multifunctional carbine and/or nitrene precursor and treatment can lead to enhanced cross-web toughness.

Carbene and/or nitrene intermediates involving a plurality of chemical reactions can also be used to insert a specific structure designed to induce crosslinking in a polyolefin microporous separator membrane. Since crosslinks in polyolefin materials will anchor polymer molecules together, an additional advantage is gained that enhances battery safety through the reinforcement of cross-web strength of the microporous polyolefin separator membrane.

As an example, a molecule incorporating greater than 1 carbene and/or nitrene precursor can be applied to the polyolefin microporous separator membrane after the pores have been formed, creating a crosslinked surface. Crosslinking of the polyolefin microporous separator membrane surface can be important in high temperature end use applications. By creating a lightly crosslinked surface, the temperature resulting in loss of the structural integrity of the polyolefin microporous separator membrane can be increased and tailored to a particular temperature range based on the crosslink density. This can be accomplished as the crosslinked material can retain the molten bulk material that has no crosslinks. As the density of surface crosslink is increased, the ability to act as an exoskeleton which maintains structural integrity of the polyolefin microporous separator membrane is increased.

In addition, the crosslinking molecule incorporating greater than 1 carbene and/or nitrene precursor can be added to a polyolefin polymer resin during the extrusion process to form a nonporous precursor separator membrane. This precursor is then stretched to form the pores of the microporous polyolefin membrane resulting in a microporous polyolefin membrane with improved tensile strength and melt integrity at high temperatures.

In at least selected embodiments, the separator may be a nonwoven material such as a nonwoven made up of fibers and chemically modified to improve the high temperature melt integrity of the nonwoven and/or to improve the wettability of the nonwoven.

In accordance with at least certain objects of the instant invention, there are provided new, improved or modified surface modified polymeric materials, modified functionalized polymers, functional polymers, chemically modified substrates including modified functionalized polymers, methods of making and/or using surface modified polymeric materials, modified functionalized polymers, functional polymers, and/or chemically modified substrates including modified functionalized polymers, methods of modifying a functionalized polymer and/or methods of using modified functionalized polymers to chemically react with the surface of a substrate, and/or methods of using such chemically modified substrates. At least certain embodiments or objects are directed to modified functionalized polymers, functional polymers, and methods of modifying functionalized polymers for chemically modifying porous and/or nonporous polymer substrates and/or methods of using such modified substrates. At least selected embodiments or objects are directed to modified functionalized polymers, functional polymers, and methods of modifying functionalized polymers for chemically modifying porous and/or microporous polymer substrates and methods of using such modified substrates. At least certain embodiments or objects are directed to modifying certain functionalized polymers to enable them to effect a change in the surface property of a substrate. In accordance with at least selected possibly preferred embodiments, the invention is directed to using a carbene and/or nitrene crosslinking modifier to chemically modify a functionalized polymer to form a modified functionalized polymer which can chemically modify the surface of a substrate and effect a change in the surface properties of the substrate for an intended application. In accordance with at least selected possibly preferred embodiments, the invention is directed to using a carbene and/or nitrene crosslinking modifier (component B) to covalently modify a polymeric surface with a functionalized polymer (component A). Such a modification may alter the chemical reactivity of the polymeric surface enabling the modified substrate to have a specifically designed functionality for an intended end use or application.

With reference to FIG. 1, nitrene generation, carbene generation, and the insertion mechanism in accordance with at least selected possibly preferred embodiments of the present invention are shown. The R, R' and/or R/R' groups may be modified to tailor surface characteristics of a polyolefin, such as the surface of a polyolefin substrate, for example, the R/R' groups can be modified to tailor surface characteristics such as wetting.

Figure 2:
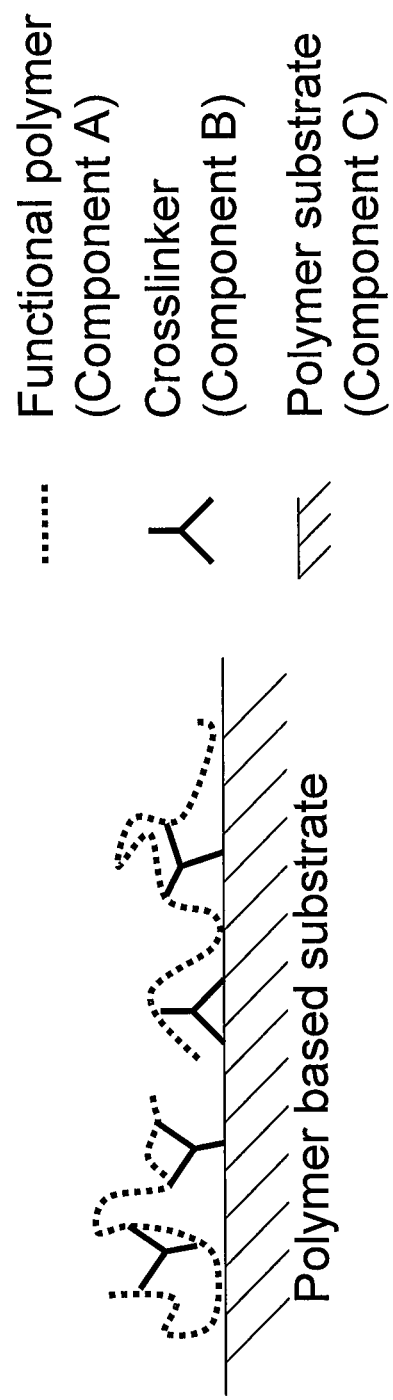
FIG. 2 is a schematic illustration of a surface modified polymeric material or a chemically modified substrate including modified functionalized polymers in accordance with at least selected possibly preferred embodiments of the present invention.

With reference to FIG. 2, a surface modified polymeric material or a chemically modified substrate including modified functionalized polymers in accordance with at least selected possibly preferred embodiments of the present invention is shown.

Figure 3:
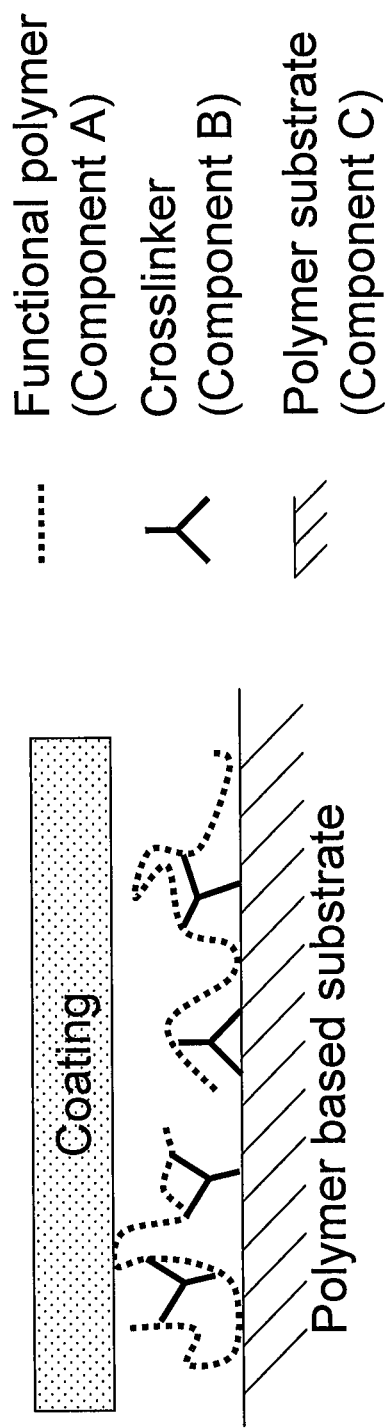
FIG. 3 is a schematic illustration of a coated or treated surface modified polymeric material or a coated or treated chemically modified substrate, for example, modified by modified functionalized polymers to facilitate the desired coating or treatment (such as by raising or lowering the surface energy of the polymeric material or substrate suface) in accordance with at least selected possibly preferred embodiments of the present invention.

With reference to FIG. 3, a coated or treated surface modified polymeric material or a coated or treated chemically modified substrate, for example, modified by modified functionalized polymers to facilitate the desired coating or treatment (such as by raising or lowering the surface energy of the polymeric material or substrate suface) in accordance with at least selected possibly preferred embodiments of the present invention is shown.

The present invention relates to new, improved or modified polymer materials, membranes, substrates, and the like and to new, improved or modified methods for permanently modifying the physical and/or chemical nature of surfaces of the polymer substrate for a variety of end uses or applications. For example, one improved method uses a carbene and/or nitrene modifier to chemically modify a functionalized polymer to form a chemical species which can chemically react with the surface of a polymer substrate and alter its chemical reactivity. Such method may involve an insertion mechanism to modify the polymer substrate to increase or decrease its surface energy, polarity, hydrophilicity or hydrophobicity, oleophilicity or oleophobicity, and/or the like in order to improve the compatibility of the polymer substrate with, for example, coatings, materials, adjoining layers, and/or the like. Furthermore, this invention can be used to produce chemically modified membranes, fibers, hollow fibers, textiles, and the like, for example, to produce polyolefin microporous battery separators or membranes having improved hydrophilicity or wettability, having cross-linking in at least the surface of the polyolefin which can improve the high temperature stability, and/or the like.

In accordance with at least selected oleophobic related embodiments:

1. The polymer surface (film, fiber, or bulk material) is modified with a mixture of multifunctional carbene and/or nitrene precursor (component B) and a desired functional synthetic polymer (component A)
   a. The polymer surface can be any synthetic or natural polymer or copolymer from the following polymer classes: olefinic, styrenic, silicone, urethane, acrylate, ester, vinyl, cellulosics, amides, aramids, ethers and the like. It can also be a cross linked network material, such as phenol-formaldehyde resin or rubber type materials like butadiene, isoprene, and neoprene. Additionally, modifications to other halogen containing polymers like PTFE, PVDF, PVDC, and PVC can be effected.
   b. Component A is a material typically found in hydrophobic or oleophobic treatment applications. Materials like fluorinated acrylic copolymer systems heavily used as textile treatments or chitin based materials may provide suitable resistance to oils. Additionally, component A may be a composite material with additional nanoparticles to generate nanoscale roughness for resistance enhancement.
   c. Component B is a multifunctional material ($f>2.0$) that has pendant functional groups tailored to generate carbene and/or nitrene species in situ.
2. The coating weight for these can come from an organic or aqueous solution and developed by heat treatment or exposure to UV light.
   a. The modification can be added to a surface in enough quantity to effect the surface properties that are required for the intended application. Typical application rates may range from about 0.05 g/m2 to 1.0 g/m2 or more, and is dependent on substrate surface area, solution viscosity, cure rate, amongst other factors.
   b. The ratio between component A and B can be variable to generate the best properties. Typical A/B application weight ratio might range from about 0.5 to 200.0 or more, depending on desired surface properties and the reactivity of A with B.

In accordance with at least selected objects or embodiments, the invention provides or is directed to:

Modified polymer substrates, surface modified polymeric materials, modified functionalized polymers, functional polymers, or chemically modified substrates including modified functionalized polymers as shown or described herein.

The above invention, wherein the modified polymer substrate is a chemically modified polymer substrate.

The above invention, wherein the modified polymer substrate is at least one of a porous polymer substrate, a nonporous polymer substrate, a porous hollow fiber, a nonporous hollow fiber, a porous battery separator or membrane, a film, a chemically modified polymer substrate, a fiber, a textile, a polyolefin material, a polyolefin blend, a polypropylene material, a polyethylene material, a polymer surface layer, a composite, a combination thereof, or the like.

The above invention, wherein the modified polymer substrate is chemically modified by the chemical reaction of at least one of carbene and nitrene intermediates with the carbon-hydrogen bonds of the polymer substrate to covalently attach at least one modified functionalized polymer thereto.

Methods of making or methods of using modified polymer substrates, surface modified polymeric materials, modified functionalized polymers, functional polymers, or chemically modified substrates including modified functionalized polymers, films, hollow fibers, fibers, textiles, composites, layers, surfaces, chemically modified polyolefin microporous membranes, chemically modified polyolefin microporous battery separators or battery separator membranes, microporous battery separators or battery separator membranes, ribbed materials, combinations thereof, methods of improving the wettability of the polyolefin microporous battery separators in lithium ion rechargeable batteries, methods of introducing crosslinking into the polyolefin microporous separators, and/or the like as shown or described herein.

The above method including at least one step of chemically modifying a polyolefin microporous battery separator membrane by the chemical reaction of at least one of carbene and nitrene intermediates with the carbon-hydrogen bonds of the polyolefin, improving the wettability of a polyolefin microporous battery separator adapted for use in a lithium-ion rechargeable battery, introducing crosslinking into a polyolefin microporous battery separator, and/or the like.

In a battery separator, the improvement comprising a polyolefin microporous membrane having at least a portion of at least one surface chemically modified.

The above separator, wherein said chemically modified polyolefin has a surface energy of equal to or greater than the surface energy of polyethylene.

The above separator, wherein said chemical modification raises the surface energy of the polyolefin to at least about 48 dynes/cm.

The above separator, wherein the polyolefin microporous membrane is chemically modified to raise the surface energy of said membrane.

The above separator, wherein said polyolefin is selected from the group consisting of polyethylene, polypropylene, blends, mixtures, and copolymers thereof.

In a battery comprising an anode, a cathode, an electrolyte, and a separator, the improvement comprising the above separator.

In a textile comprising a polyolefin microporous membrane, the improvement comprising said polyolefin microporous membrane having at least a portion of at least one surface chemically modified.

The above textile, wherein said chemically modified polyolefin membrane has a surface modification comprising a cellulosic material for the purpose of a secondary standard textile treatment, such as dyeing or other finishing step.

The above textile, wherein said chemically modified polyolefin membrane has a surface energy of equal to or less than the surface energy of polytetrafluoroethylene.

The above textile, wherein said chemical modification lowers the surface energy of the polyolefin membrane to at most about 20 dynes/cm.

A textile laminate containing at least one synthetic or natural fabric bonded with the above polyolefin membrane.

An oleophobic modified polyolefin textile membrane comprising a polyolefin microporous membrane chemically modified to lower the surface energy of said membrane, wherein said polyolefin is selected from the group consisting of polyethylene, polypropylene, and copolymers thereof, and wherein said chemically modified polyolefin has a surface modification consisiting of an oleophobic polymer or combination of polymers, and/or the like.

A microporous polymer membrane having at least one surface or portion chemically modified by the chemical reaction of at least one of carbene and nitrene intermediates to covalently attach at least one modified functionalized polymer thereto to provide a durable chemical modification that provides at least one of improved wettability, reduced wettability, hydrophilicity, hydrophobicity, oleophobicity, resistance to fouling by biological materials, resistance to wetting by organic solvents, resistance to wetting by methanol, ethanol, 1-propanol, acetone, and other polar type solvents, resistance to wetting by aliphatic and aromatic type solvents.

Potentially preferred porous membranes (porous polymer substrates) are disclosed in US Published Patent Applications 2007/0196638 A1 published Aug. 23, 2007 and 2011/0223486 A1 published Sep. 15, 2011, both hereby incorporated by reference herein. Potentially preferred component B materials such as carbine precursors are disclosed in WO Published Patent Applications 2010/100410 A1 published Sep. 10, 2010 and 2010/100413 A2 published Sep. 10, 2010, both hereby incorporated by reference herein. Potentially preferred component A materials such as fluorocopolymers are disclosed in US Published Patent Application 2012/0070648 A1 published Mar. 22, 2012, which is hereby incorporated by reference herein.

Many other modifications and variations of the present invention are possible to the skilled practitioner in the field in light of the teachings herein. It is therefore understood that, within the scope of the claims, the present invention can be practiced other than as herein specifically described.

What is claimed is:

1. In a battery separator, the improvement comprising a modified substrate comprising:
    a microporous polyolefin substrate having a surface, and
    a modified functionalized polymer (A-B) coated on the surface of the substrate to form a modified substrate,
        the modified functionalized polymer A-B consists of a functionalized polymer (component A) and a crosslinking component (component B),
    the modified functionalized polymer A-B is tethered to the polyolefin substrate via a covalent bond formed from a nitrene insertion reaction between B and the polyolefin,
    the component A comprises ethylene oxide, and
    the modified functionalized polymer A-B is coated on the surface of the substrate in an amount of from about 0.05 g/m$^2$ to about 1.0 g/m$^2$, and the modified functionalized polymer A-B having a weight ratio of component A to component B of from 0.5:1 to 200.0:1.

2. The battery separator according to claim 1 further comprising a coating overlaying the modified functionalized polymer.

3. The battery separator according to claim 1 wherein the nitrene insertion reaction is activated by heat or light.

4. The battery separator according to claim 1 wherein component A is functional, the functionality is selected from the group of modifying a hydrophobicity of the substrate, modifying a hydrophilicity of the substrate, modifying an oleophobicity of the substrate, modifying an oleophilicity of the substrate, modifying a surface energy of the substrate, enhancing anti-fouling of the substrate, and promoting adhesion to the substrate.

5. A battery comprising an anode, a cathode, a separator comprising the battery separator of claim 1 between the anode and the cathode, and an electrolyte in communication between the anode and the cathode.

6. The battery according to claim 5 is a lithium-ion battery.

7. The battery separator according to claim 1, wherein the ethylene oxide comprises poly(ethylene oxide) polymer.

8. The battery separator according to claim 1, wherein the ethylene oxide comprises poly(ethylene oxide) oligomer.

9. The battery separator according to claim 1, wherein the microporous polyolefin substrate comprises a multilayer membrane.

10. In a battery, the improvement comprising the battery separator of claim 1.

\* \* \* \* \*